Jan. 27, 1925.
H. M. KORETZKY
DRY BATTERY
Filed June 30, 1920
1,524,561
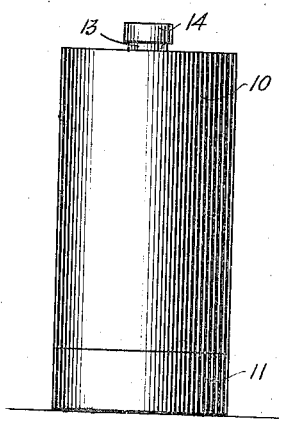
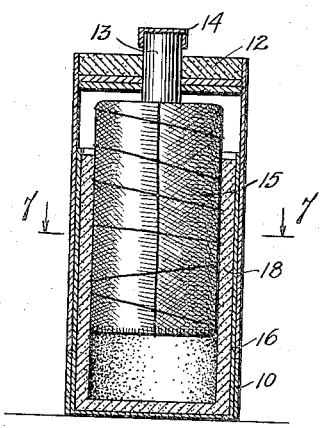
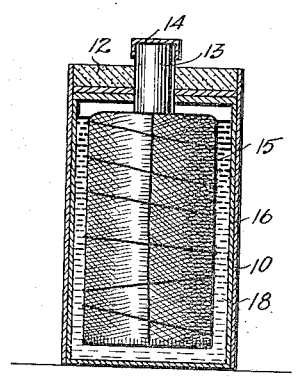
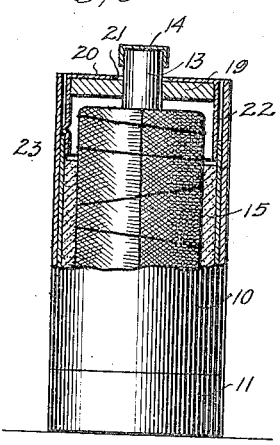
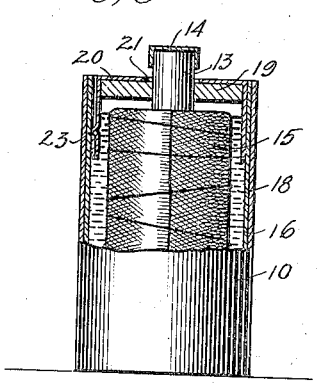
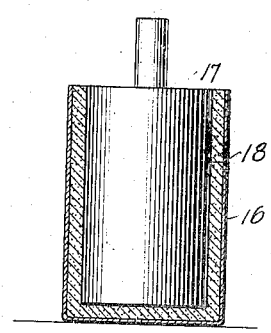
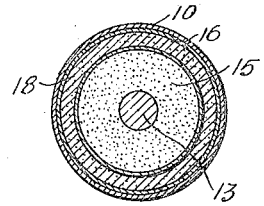
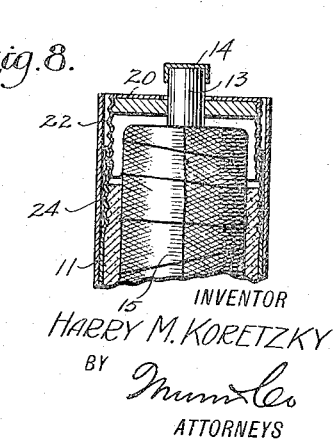
INVENTOR
HARRY M. KORETZKY
BY
ATTORNEYS Patented Jan. 27, 1925.

1,524,561

UNITED STATES PATENT OFFICE.

HARRY M. KORETZKY, OF NEW YORK, N. Y.

DRY BATTERY.

Application filed June 30, 1920. Serial No. 392,927.

*To all whom it may concern:*

Be it known that I, HARRY M. KORETZKY, a citizen of the United States, and resident of the city of New York, borough of Manhattan, county and State of New York, have invented a new and Improved Dry Battery, of which the following is a full, clear, and exact description.

My invention relates to dry batteries, and aims to provide a device of this character which shall present a construction permitting of the production of a dry battery embodying numerous improved qualities.

It is well understood by wholesalers and retailers of dry batteries that although a battery may not be placed in use, i. e. current drawn directly from the same, that a certain amount of re-action is continually occurring within the cells which results in a rapid deterioration of the same; so much in fact that after a certain length of time a battery will have to be discarded although the same has never been subjected to any use.

With this in mind, it will readily be appreciated that a most desirable type of battery from both the dispensers and consumers point of view, would be one in which no current might be given off, or no re-action capable of taking place until the same was to be used.

It is further understood that the conventional insulating compound utilized in connection with the upper central electrode terminal is expensive in application, and is subject to cracking and other numerous defects, aside from the fact that ofttimes the terminal will be displaced in applying the non-insulating compound so that the electrode will not be exactly in line with the contact point of the consuming element, resulting in a poor contact.

With these defects in mind, I have constructed a dry battery in which loss of current and deterioration due to chemical reaction of the elements within the same is pre-cluded until the same is to be applied to a consuming element with which it is to be associated.

A further object of my invention is the construction of a battery in which the central electrode terminal will be properly held, and insulated without danger of the same becoming displaced, at the same time reducing the cost of manufacture to a minimum.

Reference is had to the attached sheet of drawings as illustrating practical embodiments of my invention, and in which drawings,—

Figure 1 is a side view of a battery constructed in accordance with my invention.

Figure 2 is a sectional side view of the cell.

Figure 3 illustrates the battery in condition for use.

Figure 4 is a sectional view showing my improved method of mounting a central electrode and terminal thereof, and prior to the manipulation of the parts of the cell to their active position.

Figure 5 is a similar view showing the parts subsequent to this movement.

Figure 6 illustrates the method of producing one of the finished parts.

Figure 7 is a sectional end view taken along the lines 7—7 of Figure 2, and

Figure 8 is a sectional view of a slightly modified form of cell.

In these views the reference numeral 10 indicates a housing of insulating material, it being noted that the same is formed with an extended separate portion 11 for a purpose hereinafter more fully specified.

In the usual manner layers of any suitable insulating material 12 form the upper surface of the battery through which layers the central electrode terminal 13 projects, which terminal may conveniently be provided with an associated brass cap 14.

Secured to the lower end of this terminal is a depolarizing core forming one of the energizing units of the battery, which core preferably includes a container 15.

The second energizing unit is composed of a zinc cup 16 retained within the housing 10 and extended portion of the same, so that the upper edge of the cup is spaced from the lower face of the insulating material 12.

Prior to the adoption of the second energizing unit in this position, the gelatinized paste conveniently provided within the zinc cup is positioned therein, a plunger such as 17, as shown in Figure 6 being projected into the cup 16 to displace the paste to the space existent between the under and side faces of the plunger and the inner faces of the side wall and base of the cup 16.

Subsequent to this, the material contained wihin the cup is subject to either artificial or natural heat drying of any desirable type, and the plunger removed after this has been accomplished.

By virtue of the fact that practically all of the fluid forming a part of the paste originally placed within the cup 16 has been evaporated by this treatment, it will be appreciated that upon the plunger 17 being removed, that a skin 18 composed of the solid particles going to form the paste will remain in position against the inner face of the container 16, this container being subsequently applied to the parts forming the balance of my battery as has been clearly shown in Figure 2.

It will readily be understood that by virtue of this construction that no chemical re-action or deterioration of the battery may take place, or that any current will be produced within the same upon the parts being in a position indicated in this figure.

When it is now desired to use a battery, it will be obvious that the cup 16 may be withdrawn from the housing 10, and the portion 11 of the latter may now be discarded. A certain amount of water is placed within the cup 16, and it will be obvious that this fluid will quickly result in a dissolving of a sufficient amount of the skin 18 to produce an emulsion which, upon the parts being reassembled in the manner illustrated in Figure 3, i. e. the cup 16 being moved to a position at which it is in intimate contact with the upper face of the insulating material 12, that the battery will become active.

It will also be understood that it might be desirable to provide a certain means preventing any accidental telescoping of the parts prior to the time at which the battery is to be put into active service, and with a view of providing a more desirable type of insulating member the construction shown in Figure 4 may be adopted. In this figure it will readily be seen that the housing 10 is constructed in the usual manner, it being noted, however, that contrary to the usual construction which provides a layer of insulating material, such as 12, that I conveniently utilize a washer 19 of any desirable material, embodying sealing, insulating and preferably flexible qualities, through which the terminal 13 extends.

It is to be noted, however, that in this construction that a cap 20 is provided, which is formed with a centrally disposed opening 21 of a diameter larger than that of the electrode 13 so that any contact between these two members is pre-cluded.

The cap is formed with a downwardly extending flange 22 which is of a diameter sufficient to permit of its introduction into the cup 16, and which is further provided with an outwardly struck portion 23 normally adapted to rest against the upper edge of the cup 16 and to prevent any accidental movement of one of these members with respect to the second of the same.

It will be understood that the operation of the battery, as illustrated in Figures 4 and 5 is identical with the battery shown in Figures 1 to 3, i. e. the skin 18 is emulsified, and upon the cap being telescoped with respect to the cup subsequent to the dissolving of this skin, it will be appreciated that an active battery is formed.

Finally, it will be understood that any desirable means for combining the parts of the battery may be employed, and with this in mind, I have illustrated a slightly modified form shown in Figure 8, in which the flange 22 of the cap is threaded, the screw threads of the same engaging the screw threads 24 formed in the inner face of the cup 16, it being obvious that upon the cap being turned down that a combining action will result producing the desired result.

Obviously numerous modifications of structure might be resorted to without in the least departing from the spirit of my invention.

I claim—

1. A dry battery, including a casing, a normally inactive element arranged within said casing, a second element comprising the solid particles of an emulsion also arranged within said casing and upon the inner faces thereof, said casing being adapted to be opened to permit the introduction of water into the same whereby to emulsify the solid particles of said latter element, and to produce an active battery.

2. A dry battery, including a casing, a normally inactive element arranged within said casing, a second element comprising the solid particles of an emulsion also arranged within said casing and upon the inner faces thereof, means permitting of the introduction of fluid into said casing to emulsify said solid particles, and means permitting of the subsequent moving of said elements into intimate contact.

3. A dry battery, including a housing of insulating material formed in two sections, a cup within said housing, an element of said battery supported by the upper end of said housing, the upper edge of said cup being normally spaced from the inner face of said end portion, one of the sections of said housing being adapted to be discarded, said cup subsequently moving inwardly within the housing and contacting with the end portion thereof.

4. A dry battery, including a cup, a cap associated with the upper end of such cup, said cap being formed with a central opening, an insulator arranged within said cap and formed with an opening adapted to align with the first named opening and of a diameter smaller than the same, an element provided with a terminal of a diameter subsequently equal to that of the insulator opening, said terminal being adapted to project through said opening and a second element associated with said cup.

HARRY M. KORETZKY.